United States Patent
Bedi et al.

(10) Patent No.: US 10,755,280 B2
(45) Date of Patent: Aug. 25, 2020

(54) SEGMENTED DATA ANALYSIS USING DYNAMIC PEER GROUPINGS AND AUTOMATED RULE IMPLEMENTATION PLATFORM

(71) Applicant: VISA INTERNATIONAL SERVICE ASSOCIATION, San Francisco, CA (US)

(72) Inventors: Ratinder Bedi, San Ramon, CA (US); Michael Tsung, Lafayette, CA (US); Mayrose Kragas, Foster City, CA (US); Christopher DeMartini, San Carlos, CA (US); Nirmal Baid, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 443 days.

(21) Appl. No.: 15/406,562

(22) Filed: Jan. 13, 2017

(65) Prior Publication Data
US 2018/0204217 A1 Jul. 19, 2018

(51) Int. Cl.
*G06Q 20/40* (2012.01)
*G06Q 40/02* (2012.01)
*G06Q 10/06* (2012.01)

(52) U.S. Cl.
CPC ..... *G06Q 20/4016* (2013.01); *G06Q 10/0635* (2013.01); *G06Q 20/405* (2013.01); *G06Q 40/02* (2013.01)

(58) Field of Classification Search
CPC .. G06Q 20/4016; G06Q 20/405; G06Q 40/02; G06Q 10/0635
See application file for complete search history.

(56) References Cited

U.S. PATENT DOCUMENTS 8,255,323 B1 * 8/2012 Casey ............... G06Q 20/3221
 705/35
8,544,727 B1 10/2013 Quinn
(Continued)

FOREIGN PATENT DOCUMENTS

WO 2000068861 A1 11/2000
WO 2015099870 A1 7/2015

OTHER PUBLICATIONS

Sahajwala, et al., "Supervisory Risk Assessment and Early Warning Systems", http://www.bis.org/publ/bcbs dated Dec. 1, 2000, 59 pgs.
(Continued)

*Primary Examiner* — Scott C Anderson
(74) *Attorney, Agent, or Firm* — Kilpatrick Townsend & Stockton LLP

(57) ABSTRACT

Described herein are systems and methods for providing accurate assessments of existing fraud rules while controlling for various transaction risks. In some embodiments, transaction data may be obtained from a number of entities and may be segmented by applying various filters. Once segmented, each segment may be analyzed to obtain metrics for a target entity. A separate set of peers is dynamically determined for each segment. The metric values for the target entity may then be compared to the metric values for the peers in the peer set to assess the target entity's performance with respect to each segment. Based on a variance of the target entity from its peers, the system may identify the segment as an opportunity. A rule may then be generated automatically based on the identified segment. In some embodiments, the rule may be added to a rule file for automatic implementation by the target entity.

15 Claims, 8 Drawing Sheets

(56) References Cited

U.S. PATENT DOCUMENTS

| | | | | |
|---|---|---|---|---|
| 2004/0117300 A1* | 6/2004 | Jones | ............... | G06Q 20/10 |
| | | | | 705/39 |
| 2006/0059063 A1 | 3/2006 | LaComb | | |
| 2007/0119918 A1* | 5/2007 | Hogg | ............... | G06Q 20/04 |
| | | | | 235/380 |
| 2009/0217178 A1* | 8/2009 | Niyogi | ............... | G06Q 10/00 |
| | | | | 715/753 |
| 2009/0276837 A1* | 11/2009 | Abzarian | ............... | G06F 21/31 |
| | | | | 726/5 |
| 2011/0161419 A1* | 6/2011 | Chunilal | ............... | G06Q 10/00 |
| | | | | 709/204 |
| 2012/0290446 A1* | 11/2012 | England | ............... | G06Q 30/0282 |
| | | | | 705/27.1 |
| 2013/0166436 A1* | 6/2013 | Eze | ............... | G06O 40/025 |
| | | | | 705/38 |
| 2013/0231974 A1* | 9/2013 | Harris | ............... | G06Q 30/0201 |
| | | | | 705/7.29 |
| 2014/0092424 A1* | 4/2014 | Grosz | ............... | G06F 3/1242 |
| | | | | 358/1.15 |
| 2014/0249776 A1* | 9/2014 | King | ............... | G06F 17/18 |
| | | | | 702/179 |
| 2014/0258083 A1* | 9/2014 | Achanta | ............... | G06Q 40/025 |
| | | | | 705/38 |
| 2014/0316960 A1 | 10/2014 | Murali | | |
| 2015/0302388 A1* | 10/2015 | Seidman | ............... | G06Q 20/3224 |
| | | | | 705/26.7 |
| 2017/0200087 A1* | 7/2017 | Mascaro | ............... | G06Q 40/12 |

OTHER PUBLICATIONS

Weston, et al., "Plastic Card Fraud Detection Using Peer Group Analysis", http://www.business-school.ed.ac.uk/waf/crc_archive/2007/presentations/weston-david.pdf dated Mar. 27, 2008, 18 pgs.
Henzel, et al. "Using Model Calibration and Optimization to Reduce Fraud Risk", Crowe Horwarth, https://www.crowehorwath.com/folio-pdf/Using-Model-Calibration-and-Optimization-to-Reduce-Fraud-Risk-Article-RISK-16007-008A dated Feb. 1, 2015, 8 pgs.
Kim, et al., "Stock Fraud Detection Using Peer Group Analysis", http://www.sciencedirect.com/science/article/pii/S0957417412002692 dated Aug. 2012, 7 pgs.

\* cited by examiner

SEGMENTED DATA ANALYSIS USING DYNAMIC PEER GROUPINGS AND AUTOMATED RULE IMPLEMENTATION PLATFORM

BACKGROUND

Conventional systems for detecting transaction fraud operate using fraud rules. Fraud rules can be instituted to deny that transactions that appear to be potentially fraudulent. On the one hand, very stringent fraud rules will deny many transactions, even ones that might be legitimate. Transactions that are rejected improperly by fraud rules are called "false positives." This is undesirable. On the other hand, fraud rules which do not capture many transactions may be allowing fraudulent transactions to occur. This is also not desirable.

An entity such as an issuer or transaction processor may employ a set of fraud rules and may obtain some overall rejection and false positive rate that would appear to be acceptable to that entity. However, that entity may not actually know whether or not the performance that results from the set of rules is actually an optimum set of fraud rules.

Embodiments of the disclosure address this and other problems, individually and collectively.

BRIEF SUMMARY

Embodiments of the present disclosure are directed to systems and methods for providing accurate assessments of existing fraud rules while controlling for various transaction risks and factors. Some embodiments of the present disclosure are directed to systems and methods for automatically generating rules based on identified opportunities and implementing those rules automatically (e.g., without further human interaction).

In accordance with at least some embodiments of this disclosure, transaction data may be obtained from a number of entities comprising resource providers (e.g., merchants), transport computers (e.g., acquirers), authorization entities (e.g., issuers), or any other suitable entities. This transaction data (e.g., credit or debit card transaction data from multiple users) may be segmented by applying various filters (e.g., any transaction that has an amount over a predetermined amount such as $100). Once segmented, each segment is analyzed to obtain metrics (e.g., fraud rates) for a target entity (e.g., a bank that wants to analyze its fraud determination rate for credit card transactions within a certain segment). Based on the obtained metrics, the system is able to identify a separate set of peers (e.g., other banks) with respect to each segment. This dynamic allocation of peer sets allows the system to control for a number of factors. The metric values for the target entity may then be compared to the metric values for the peers in the peer set to assess the target entity's performance with respect to each segment. If the target entity varies significantly from its peers in a detrimental way (e.g., in a manner which is harmful or negatively impacts a target entity), then the system identifies the segment as an opportunity. For example, an entity may have a higher fraud rate than its peers in a particular segment, which is detrimental in that it suffers more losses to fraud than its peers for that segment. An opportunity may be an area for an entity, such as a bank, to improve a particular metric, such as a fraud rate, so that the metric is more in line with its peers. In some embodiments, a rule may then be automatically generated based on the identified segment. In some embodiments, the rule may be added to a rule file for automatic implementation by the target entity. For example, if a target entity such as a bank determines that its fraud rate for a certain segment of transactions (e.g., transactions over $100) varies significantly from the fraud rates of its peer banks, then one or more rules that can adjust the fraud rate for that segment for the target entity may be automatically generated and implemented. In some embodiments, the one or more rules may be determined by using, analyzing, or modifying the rules of the peers to the target entity. Alternatively, new rules may be generated to adjust the fraud rate. As an illustration, an extra rule such as one which might challenge the consumer for e-commerce transactions if transactions are over $100 might be implemented, and the implementation of this rule could bring the fraud rate for the analyzed segment down to the fraud rates of the target entity's peers.

One embodiment of the disclosure is directed to a method of generating a data set comprising receiving data for a plurality of transactions associated with a plurality of entities, determining a plurality of data segments, and identifying a target entity from the plurality of entities. The method may further comprise, for each data segment in the plurality of data segments: determining a value for the target entity with respect to the data segment, determining a set of peers for the data segment based on the value for the target entity, and determining a value for the set of peers with respect to the data segment. The method may then comprise generating the data set to include at least the values for the target entity with respect to each data segment in the plurality of data segments and the values for the set of peers with respect to each data segment in the plurality of data segments. In some embodiments, the method may further comprise identifying at least one data segment of the plurality of data segments for which a variance between the value for the target entity and the value for the set of peers is above a threshold variance level, determining that the variance is detrimental, and generating a rule to limit future transactions that would affect at least one data segment. In at least some embodiments, the method may further comprise instantiating the generated rule with respect to the target entity.

Another embodiment of the disclosure is directed to a server apparatus comprising one or more processors, and a memory including instructions that, when executed by one or more processors, cause the server apparatus to implement the method above.

These and other embodiments of the disclosure are described in further detail below.

DETAILED DESCRIPTION

Figure 1:
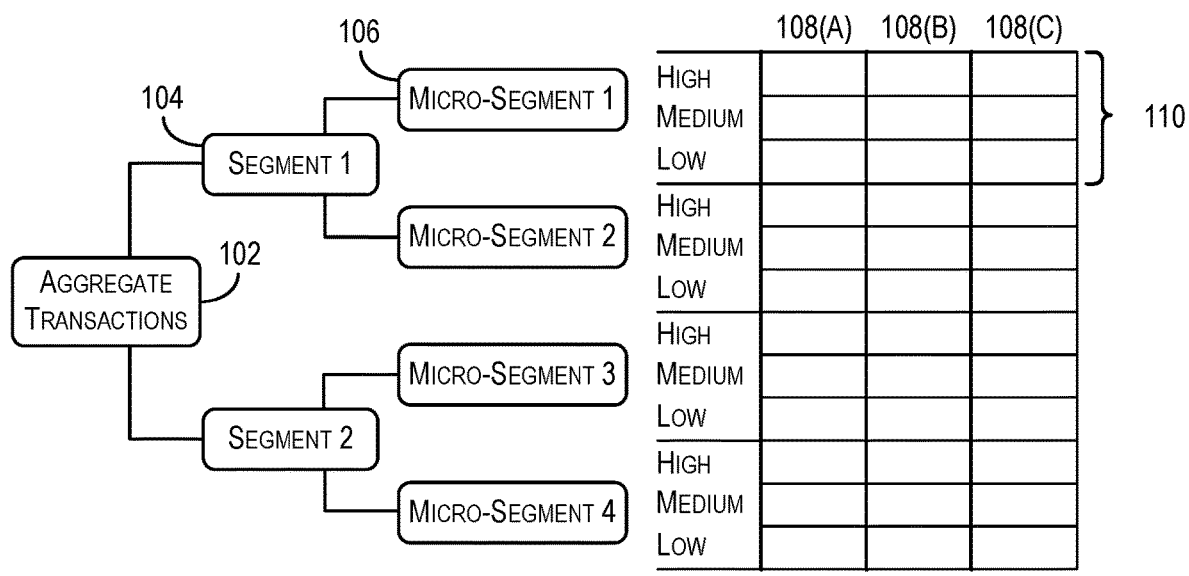
FIG. 1 depicts an illustrative example of a report that may be generated using the disclosed system in accordance with embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing embodiments of the disclosure, description of some terms may be helpful in understanding embodiments of the disclosure.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction. The code may serve as proof of authorization.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

A "segment" may be any suitable portion of a data set. In some embodiments, a segment may be generated by subjecting a data set to one or more filters. A single data set may be used to generate multiple segments. In some embodiments, a micro-segment may be generated from a segment by subjecting the segment to a number of additional filters. In some cases, a micro-segment may be referred to as a "sub-segment." For the purpose of this disclosure, a micro-segment may also be generically characterized as a segment. For example, a data set may comprise all personal information for 100 persons. However, a filter in the form of a rule may select only those members (e.g., 50 members out of 100 members) of the data set that live in a particular geographic area. Those members may form a set of members or a "segment" of the original data set.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first entity requesting resources from a second entity. In this example, the transaction is completed when the resources are either provided to the first entity or the transaction is declined. Examples of transactions may include access transactions (e.g., to enter a building or location), credit card transactions, banking transactions, debit card transactions, stored value transactions, etc.

A "transaction data" may be any information related to a transaction between two entities. Transaction information may include information related to a completed transaction or a transaction that has not yet been completed. In some embodiments, the transaction information may include any suitable information related to a context of the transaction. For example, the transaction information may include a time at which the transaction was conducted, a terminal at which the transaction was conducted, an amount for which the transaction was conducted, an indication of an entity with whom the transaction was conducted, or any other suitable transaction-related information. Transaction data may include data gathered from authorization requests.

A "value" can be a numerical quantity that is assigned or is determined by calculation or measurement. In some instances, a "value" may be referred to as a "metric." Examples of values may include fraud scores, performance scores, fraud rates, finance rates, etc.

A "target entity" may be an entity which may desire an improvement with respect to a particular metric. Examples of target entities may include transaction processors, issuers, data analytic entities, etc.

Details of some embodiments of the present disclosure will now be described.

FIG. 1 depicts an illustrative example of a report that may be generated using the disclosed system in accordance with embodiments of the disclosure. In FIG. 1, transaction data 102 may be collected and aggregated with respect to a number of authorization entities. In some embodiments, the aggregated transaction data 102 may be subjected to various filters in order to identify metrics with respect to a number of segments 104. In some embodiments, data from each segment 104 may be subjected to additional filters to identify metrics with respect to a number of micro-segments 106.

In some embodiments, various metrics may be depicted in a number of columns 108 (A-C). In some embodiments, the metric data may be depicted according to various levels of performance 110. In some embodiments, as data is analyzed for each segment and micro-segment with respect to a target entity, a new set of peers may be determined with respect to the particular segment 104 and/or micro-segment 106. A set of peers for a particular segment may be calculated as the entities having values (or metrics) that are closest to the value associated with the target entity.

It should be noted that though the disclosure focuses on a particular type of entity and data (e.g., authorization entities and transaction data), these particularities are discussed for illustration only. Embodiments of the disclosure may be implemented on a number of different types of entities. In addition, different types of data may be analyzed with respect to a single entity. For example, embodiments of the disclosure may be used to analyze both authorization data and authentication data related to a single authorization entity.

Figure 2:
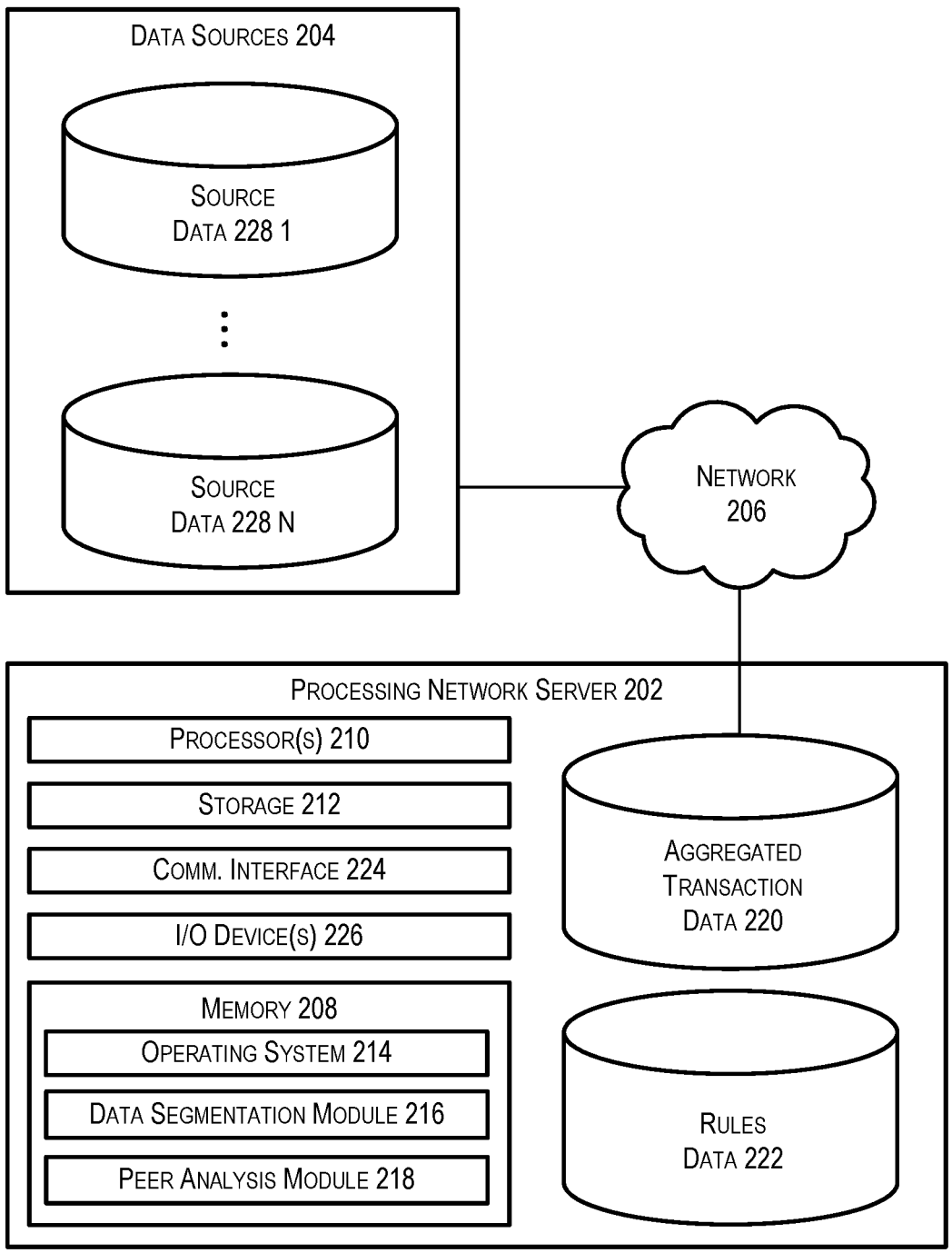
FIG. 2 illustrates an example system architecture that may be implemented to identify opportunities with respect to particular metrics and implement corresponding rules in accordance with embodiments of the disclosure.

FIG. 2 illustrates an example system architecture that may be implemented to identify opportunities with respect to particular metrics and implement corresponding rules in accordance with embodiments of the disclosure. In FIG. 2, a processing network server 202 may be in communication with multiple data sources 204 (e.g., transaction information received from various authorization entities). In some embodiments, each of the components may communicate via a network connection 206.

The processing network server 202 may be any type of computing device capable of generating prediction models from transaction data. In at least some embodiments, the processing network 202 may include at least one memory 208 and one or more processing units (or processor(s)) 210. The processor(s) 210 may be implemented as appropriate in hardware, computer-executable instructions, firmware or combinations thereof. Computer-executable instruction or firmware embodiments of the processor(s) 210 may include computer-executable or machine executable instructions written in any suitable programming language to perform the various functions described.

The memory 208 may store program instructions that are loadable and executable on the processor(s) 210, as well as data generated during the execution of these programs. Depending on the configuration and type of processing network 202, the memory 208 may be volatile (such as random access memory (RAM)) and/or non-volatile (such as read-only memory (ROM), flash memory, etc.). The processing network 202 may also include additional storage 212, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the processing network 202. In some embodiments, the memory 208 may include multiple different types of memory, such as static random access memory (SRAM), dynamic random access memory (DRAM) or ROM.

Turning to the contents of the memory 208 in more detail, the memory 208 may include an operating system 214 and one or more application programs or services for implementing the features disclosed herein including at least a module for generating segment data (data segmentation module 216) and/or a module for determining peer data for a segment (peer analysis module 218). The memory 208 may also include aggregated transaction data 220, which includes transaction data obtained from data sources and/or input file data 222, which provides rules implemented via a number of data sources.

In some embodiments, the data segmentation module 216 may, in conjunction with the processor 212, be configured to apply one or more filters to aggregated transaction data 220 to filter data into various segments. In accordance with at least some embodiments, the data segmentation module may, in conjunction with the processor 212, be configured to obtain various metrics associated with each segment with respect to a target entity as well as with respect to a number of peer entities determined using the peer analysis module 218. In some embodiments, the data segmentation module 216 may also, in conjunction with the processor 212, be configured to generate rules for automatic deployment by the target entity.

In some embodiments, the peer analysis module 218 may, in conjunction with the processor 212, be configured to identify potential peers with respect to a target entity. In some embodiments, the peer analysis module 218 may be configured to identify peers with respect to a number of data segments. In some scenarios, this may cause a different set of peers to be evaluated for each of the segments and micro-segments analyzed in a report.

The processing network 202 may also contain communications interface(s) 224 that enable the processing network 202 to communicate with a stored database, another computing device or server, one or more remote devices, other application servers, and/or any other suitable electronic devices. In some embodiments, the communication interface 224 may enable the processing network 202 to communicate with other electronic devices on a network (e.g., on a private network). The processing network 202 may also include input/output (I/O) device(s) and/or ports 226, such as for enabling connection with a keyboard, a mouse, a pen, a voice input device, a touch input device, a display, speakers, a printer, etc.

In some embodiments, the aggregated transaction data 220 may comprise information obtained from a number of data sources 228 (1-N). In some embodiments, the data sources 228 may comprise authorization entities. In some embodiments, the data sources 228 may comprise resource providers and/or acquirers.

For simplicity of illustration, a certain number of components are shown in FIG. 2. It is understood, however, that embodiments of the disclosure may include more than one of each component. In addition, some embodiments of the disclosure may include fewer than or greater than all of the components shown in FIG. 2. In addition, the components in FIG. 2 may communicate via any suitable communication medium (including the internet), using any suitable communications policy.

Figure 3:
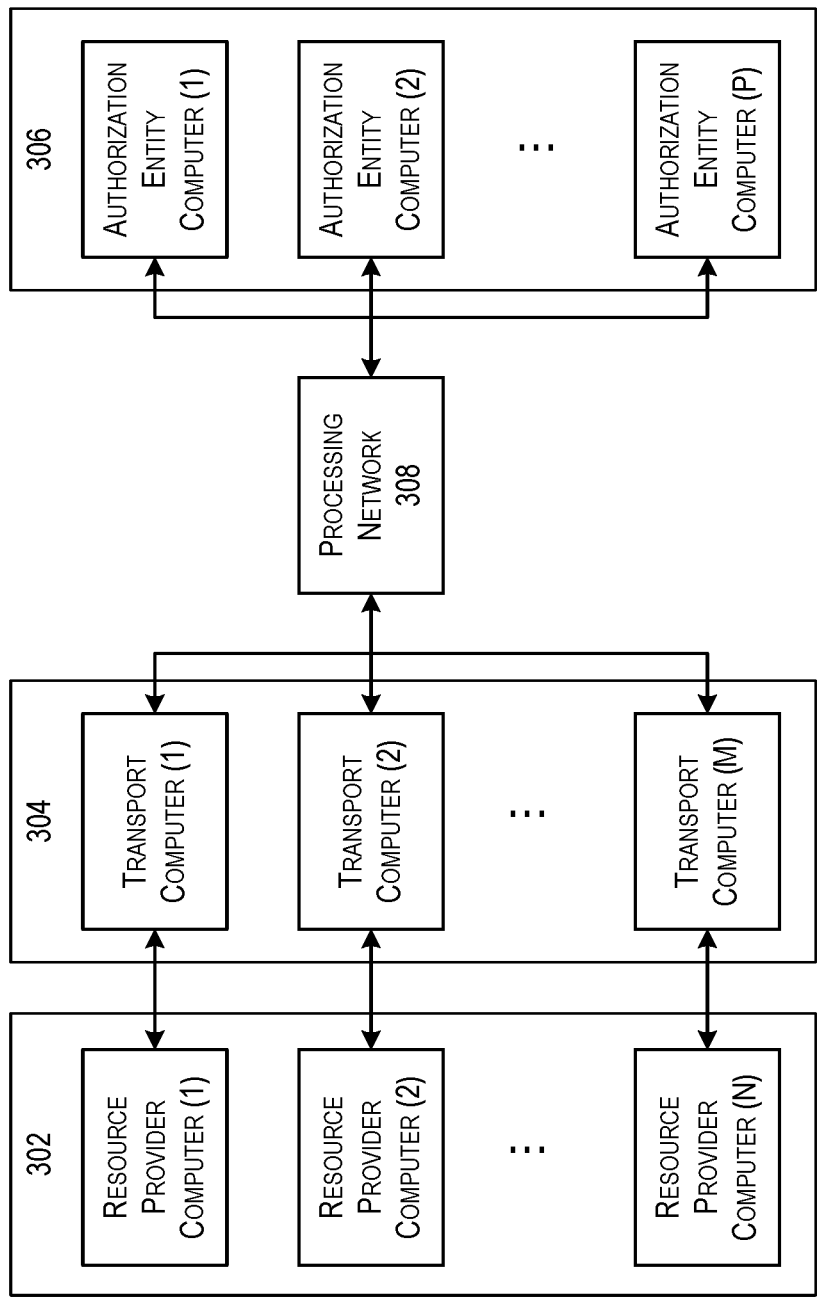
FIG. 3 depicts an illustrative flow diagram depicting a process for obtaining aggregated data from a number of entities in accordance with embodiments of the disclosure.

FIG. 3 depicts an illustrative flow diagram depicting a process for obtaining aggregated data from a number of entities in accordance with embodiments of the disclosure. In FIG. 3, a number of resource providers 302 (1-N) (e.g., merchants) may be in communication with various transport computers 304 (1-M) (e.g., acquirer computers). The transport computers 304 may, in turn, be in communication with a number of authorization entity computers 306 (1-P) (e.g., (issuer computers). In some embodiments, the transportation computers 304 may be in communication with the authorization entity computers 306 via a processing network 308.

In some embodiments, the resource provider computers 302 may be any suitable computing device or plurality of computing devices configured to provide a resource to a requesting entity. In some embodiments, the resource provider computers 302 may be associated with, and/or operated by, a resource provider (e.g., an electronic commerce site or physical retail location). For example, the resource provider may maintain a catalog of items and/or services available for purchase. The resource provider computers 302 may also be configured to complete a transaction upon receiving an authorization response message indicating that a transaction has been approved. In some embodiments, each the resource provider computers 302 (1-N) may be operated by separate entities. In some embodiments, each of the resource provider computers 302 may be configured to receive transaction information from a terminal device (e.g., within a physical retail location).

In some embodiments, the transport computers 304 may be any suitable computing device or plurality of computing devices configured to process transaction information received from the resource provider computers 302 and/or generate an authorization request message to be transmitted to the authorization entity computers 306. Each transport computer 302 may be operated by a different acquirer and may service multiple resource provider computers 302. In some embodiments, the transport computer 304 and the authorization entity 306 may be the same entity. For example, the authorization entity computer 306 may be configured to receive transaction information from the resource provider computer 302 and either authorize or decline the transaction based on that information. In some embodiments, the transport computer may be a third party entity (e.g., an entity unaffiliated with either the authorization entity computer 306 or the resource provider computer 302).

In some embodiments, the authorization entity computers 306 may be any suitable computing devices configured to assess transaction information and determine whether to approve or decline the transaction. In some embodiments, the authorization entity may be an issuer associated with a payment device (e.g., a credit card). In this example, the authorization entity computer 306 may receive transaction information related to the transactions conducted using the payment device with which it is affiliated. To do this, the authorization entity computer 306 may determine whether the transaction is in compliance with rules included in an input file. Each transport computer 304 may communicate with multiple authorization entity computers 306 as transactions are received that are relevant to each of those authorization entity computers 306.

In some embodiments, the processing network 308 may include any one or a combination of many different types of networks, such as cable networks, the Internet, wireless networks, cellular networks, and other private and/or public networks. In addition, the processing network 308 may comprise multiple different networks. In some embodiments, the processing network 308 may be an electronic payment network (e.g., VisaNet). The processing network 308 may be configured to route transaction information (e.g., authorization requests and authorization responses) between the transport computers 304 and the authorization entity computers 306. In some embodiments, at least some computing devices of the processing network 308 may monitor transaction information and record the monitored transaction information into an aggregated data source.

Figure 4:
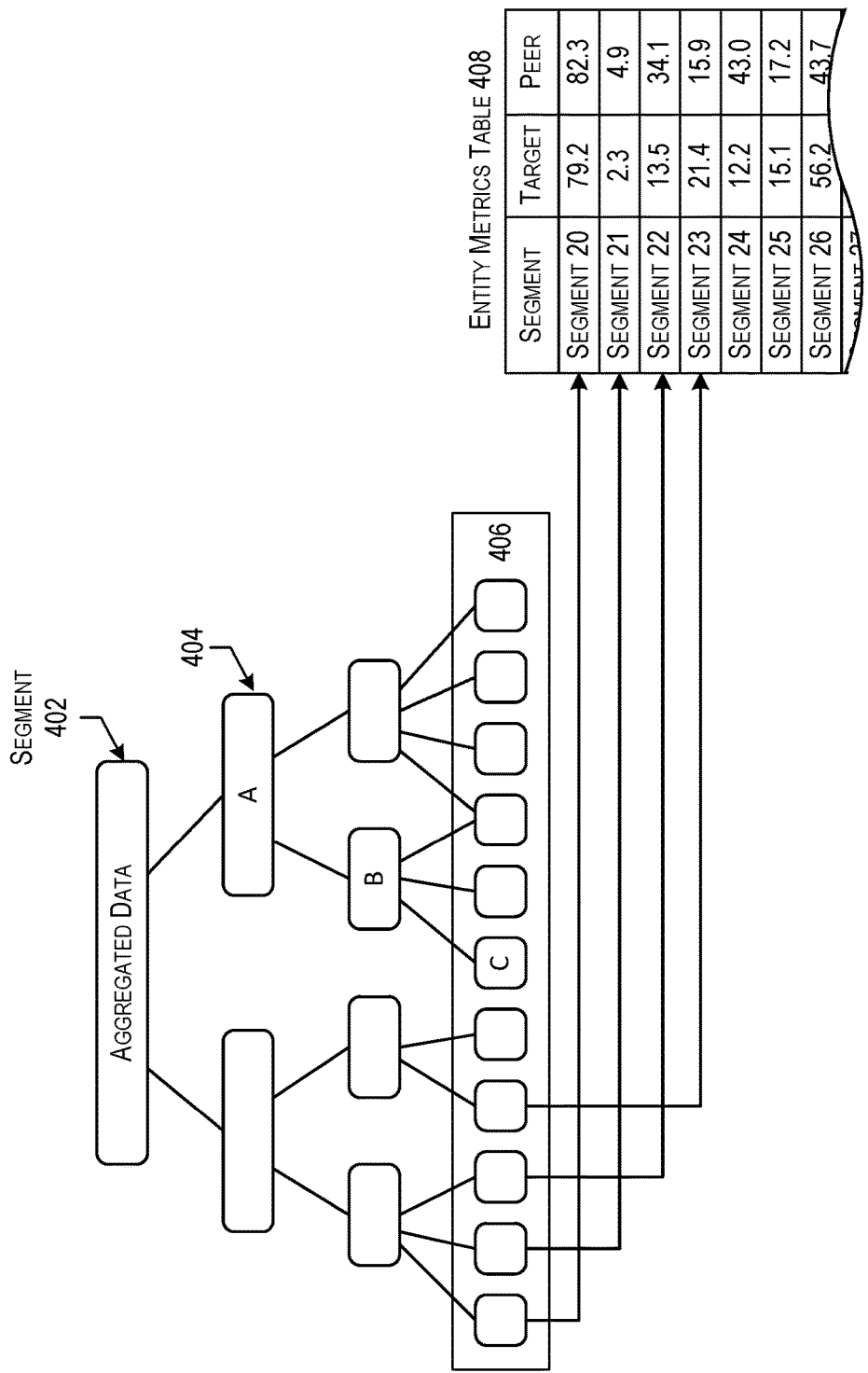
FIG. 4 depicts and illustrative example of data segmentation and storage in accordance with at least some embodiments.

FIG. 4 depicts an illustrative example of data segmentation and storage in accordance with at least some embodiments. In at least some embodiments, an aggregated set of data 402 may comprise data collected with respect to a number of data sources (e.g., resource providers, transport computers, authorization entities, etc.). The aggregated set of data 402 may be subjected to a number of filters in order to generate data segments 404 and/or data micro-segments 406 with targeted data.

In some embodiments, a number of attributes may be selectable so that the aggregated data 402 and/or data segments 404 and data micro-segments 406 may be filtered on each of the selectable attributes in order to further segment the data. Once segmented, a number of metrics may be gathered from the data for various entities. For example, a network processing server as described herein may maintain a number of target entities for which data should be processed. For each of these target entities, the processing network server may maintain a separate metrics table 408.

As described above, data may be subjected to various filters based on categories of data. For example, the processing server may elect to segment data based on whether it involves card present transactions or card not present transactions. In another example, the processing server may elect to segment transaction data based on an amount of currency associated with each transaction. For example, the transaction data may be filtered based on transactions for less than $30, transactions for an amount between $30 and $80, and transactions over $80. In this example, the transaction data may be broken into three distinct segments/microsegments based on amounts associated with the transactions in the transaction data.

In some embodiments, as each segment and micro-segment is created, metrics may be gathered for a number of target entities and stored in an appropriate metric table 408. In some embodiments, this may comprise identifying transaction data relevant to each of a number of entities within a particular segment, identifying metrics relevant to a target entity within those entities, identifying a set of peers based on those metrics, and recording metrics associated with both the target entity and the set of peers in the metric table 408. In some embodiments, each target entity may have access to its own associated metric table. In some embodiments, data associated with each segment and/or micro-segment may be mapped to a separate row of the metric table 408.

By way of illustrative example, a first filter may be applied to aggregated data 402 to create a segment A. For example, the processing network server may filter transaction data to include only domestic transactions. In this example, a segment A is created to include only data related to transactions conducted within the same country. A second filter may then be applied to segment A to create a micro-segment B. For example, micro-segment B may be generated from the transactions in data segment A by filtering those transactions to include only card present transactions.

A third filter may then be applied to micro-segment B to create a micro-segment C. For example, micro-segment C may be generated from the micro-segment B by filtering the data in B to include only transactions for amounts within a predetermined range. In this example, the processing network may process the transaction data comprising micro-segment C with respect to a number of entities. Once data for a target entity has been assessed from micro-segment C, the processing network server may determine which other entities of the number of entities are peers to the target entity with respect to micro-segment C. This is described in greater detail with respect to FIG. 5 below.

Figure 5:
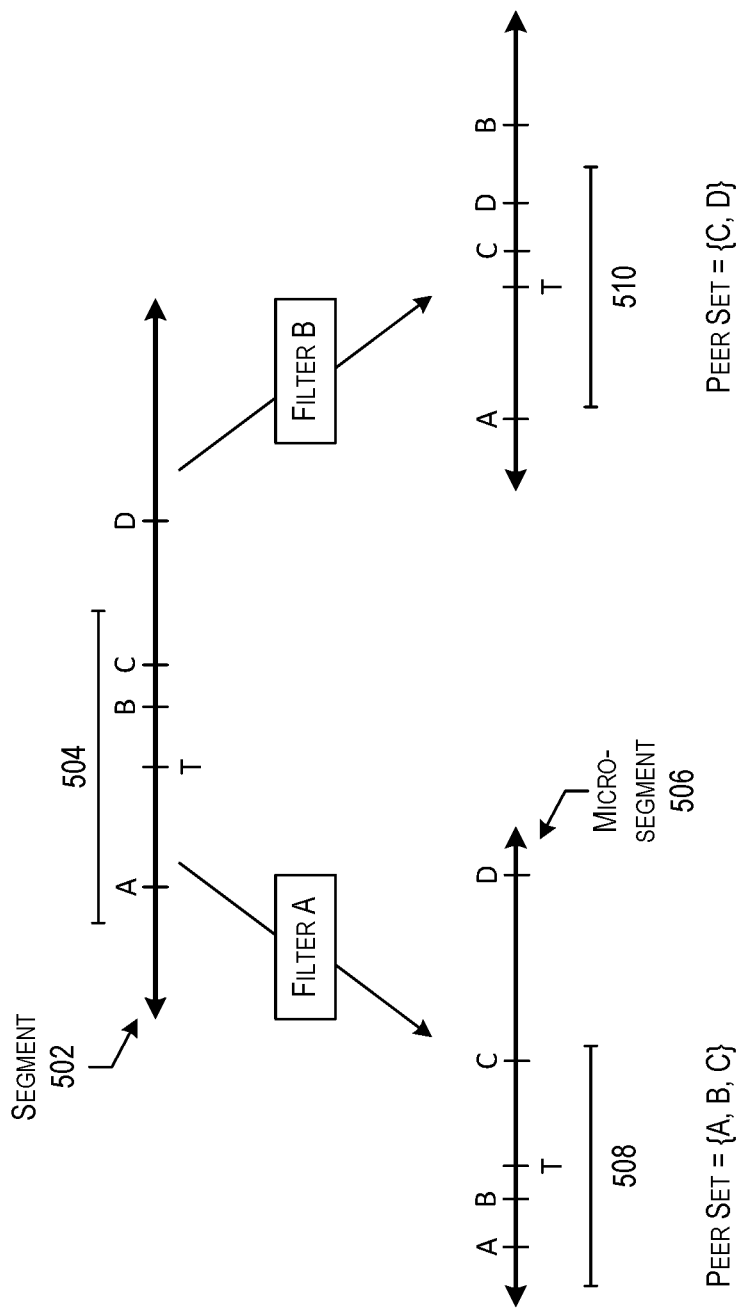
FIG. 5 depicts a process for identifying peer entities for each segment in relation to a target entity.

FIG. 5 depicts a process for identifying peer entities for each segment in relation to a target entity. In FIG. 5, a segment 502 may include transaction information for a number of entities, including a target entity T. The processing network server may assess a position of each entity with respect to the segment 502. In some embodiments, the processing network server may calculate a metric value (e.g., a fraud rate) for a target entity T (e.g., a bank) within segment 502 based on transactions associated with target entity T that fall within segment 502. The processing network may then determine which entities (represented by A-D, which may be other banks) are peers of the target entity T. For example, the processing network server may determine which entities have metric values that are within a predetermined range 504 of a metric value determined for target entity T. In some embodiments, the predetermined range 504 may vary according to a type or category of the metric being compared. In some embodiments, the peers may comprise at least the five entities that have metric values closest to the metric value associated with target entity T and are not associated with more than 50% of the transactions being analyzed within a particular segment. In some embodiments, it is useful to exclude potential peers that have more than half of the transactions in the set of transactions being analyzed, because they may not be representative of a typical peer for that segment. In some embodiments, peer groups may be determined based on one metric and a second metric may be measured. For example, although a processing network may be measuring metrics related to fraud rate for various entities, peers may be selected based on transaction volume.

By using ranges in the manner described above in order to dynamically select peer groups for each segment, the system may allow an entity to compare itself to other entities with similar policies/practices and control for various risks/factors. There may be scenarios in which different entities may or may not act as peers for certain market segments. For example, it may be assumed that all entities with proximate metric values in a segment have similar practices with respect to that segment and are therefore peers in relation to that segment, whereas entities associated with metric values that are not proximate to those of a target entity do not share similar practices and are therefore not peers. By way of illustration, one entity may have more stringent requirements with respect to approving transactions falling within a particular segment than other entities. In this illustration, metrics associated with the entity (e.g., a fraud rate) may vary significantly from those of other entities for this segment. For example, the entity's fraud rate is likely to be lower than that of other entities because of its more stringent requirements. Accordingly, it may not be appropriate to evaluate that entity with respect to other entities and that segment.

In some embodiments, a micro-segment 506 may be generated by subjecting the segment 502 to a filter (e.g., filter A or filter B). As depicted, the entities' positions with respect to the data may vary for each segment, meaning that the entities determined for each peer group may also vary for each segment. By way of illustration, metrics for target entity T may be assessed for two micro-segments, one generated by applying filter A to segment 502, and one generated by applying filter B to segment 502. In this illustrative example, a peer group {A, B, C} may be selected for the first micro-segment by applying range 508 whereas a peer group {C, D} may be selected for the second micro-segment by applying range 510. In some embodiments, range 508 may be the same as range 510. For each of the two micro-segments, peers may be adjusted from the respective peer groups after determining that a particular peer accounts for more than 50% of the data in the segment. In some embodiments, if the peer group includes a number of entities below a threshold number, then peers may be identified and added to the peer group. For example, if the system requires a peer group to include at least five peers, and a current peer group includes only two peers, then the system may identify the two next closest peers (that do not comprise 50% of the data) and add those to the peer group. In some embodiments, the members of the peer group for each segment may be kept anonymous. For example, an average value, high value, and/or minimum value associated with the target entity's peers may be presented without actually indicating the identity of the peers in the peer group.

In some embodiments, an entity may be any organization for which metrics may be obtained. For example, entities may comprise internet service providers (e.g., search engines), transit companies, issuers (e.g., credit card companies), or any other suitable organization. Metrics obtained with respect to an entity may be associated with any suitable measurement. The peers may be any entity of a same or similar type as the target entity (e.g., those that perform similar functions). For example, internet service providers may be evaluated with respect to various other internet service providers. In this example, transactions may comprise user interactions with a webserver (e.g., page visits). Various segments may be generated based on an origin (or source) of each page visit. A target internet service provider may have a first set of peers with respect to a first segment and a second set of peers with respect to a second segment. In this example, a metric may comprise a conversion rate (e.g., the proportion of visitors to a website who take action to go beyond a casual content view or website visit).

Figure 6:
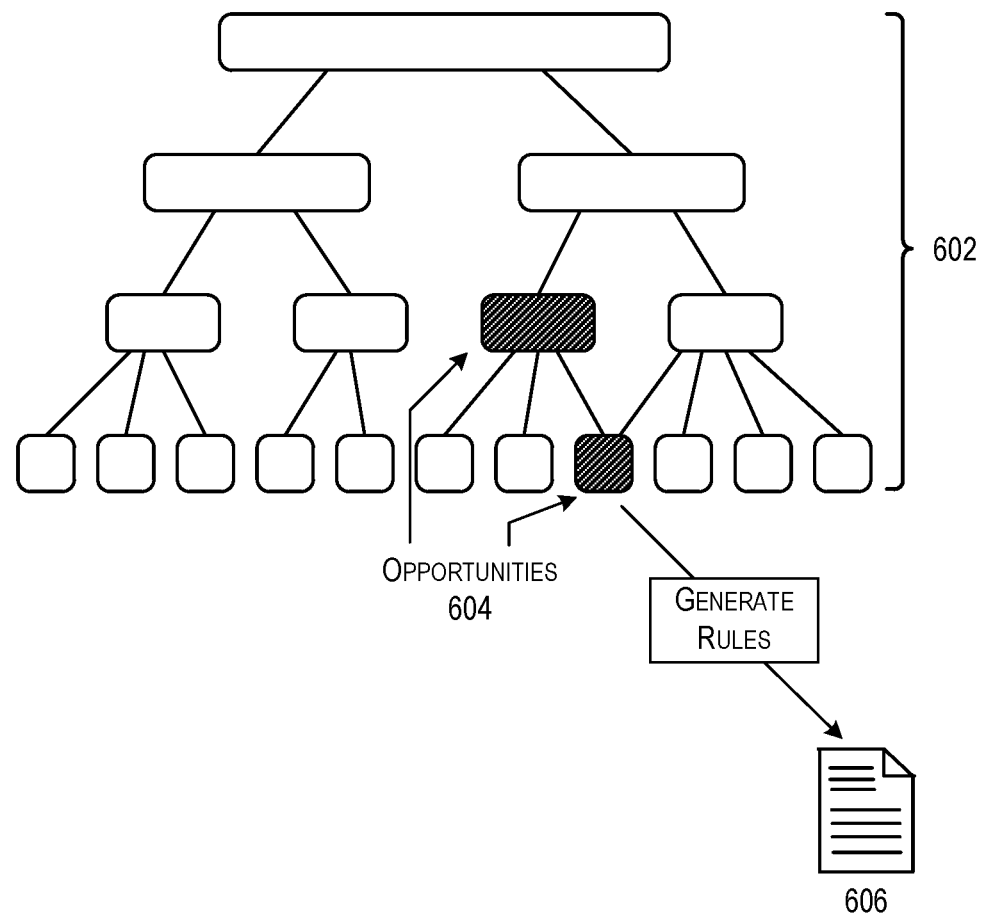
FIG. 6 depicts a process for identifying opportunities using segmented data in order to generate rules for auto-implementation in accordance with embodiments of the disclosure.

FIG. 6 depicts a process for identifying opportunities using segmented data in order to generate rules for auto-implementation in accordance with embodiments of the disclosure. In FIG. 6, a number of segments and micro-segments 602 are depicted. As described elsewhere, segments and/or micro-segments may be generated by applying various filters to data.

In some embodiments, the system may identify a number of segments for which metrics associated with the target entity vary from corresponding metrics associated with peers. In some embodiments, if a variance between a target entity metric and its peer entities' metrics is greater than a threshold variance level for a particular segment, then the system may determine that the particular segment represents an opportunity 604 to improve metrics for the target entity. In some embodiments, the system may weigh the costs of preventing future transactions for the target entity that fall within the particular segment against the benefits of those future transactions. If the system determines that the costs associated with approving the transactions outweigh the benefits of approving the transactions, then a rule may be generated to decline future transactions.

In some embodiments, rules 606 may be generated based on identified opportunities and subsequently provided to the target entity. In some embodiments, the rules 606 may be implemented by the target entity automatically. To generate a rule, the system may first identify an opportunity segment based on variances between the target entity and its peers. In some embodiments, the system may then determine whether there is a subset of the segment 604 (e.g., a micro-segment) for which the opportunity is also present. For example, if an opportunity is identified with respect to a segment A generated by applying filters A, B, and C, then the system may determine whether the opportunity also exists in micro-segments generated by applying filters D, E, and F to segment A. In some embodiments, the system may be configured to generate a rule from the segment associated with the highest number of filters. In some embodiments, creating a rule to block or require further authentication for transactions falling within a micro-segment may correct opportunities existing in a segment associated with that micro-segment.

By way of illustrative example, the system may determine that a fraud rate for Issuer A is 5% for domestic, e-commerce transactions conducted at consumer electronics stores for amounts over $100. In this example, domestic, e-commerce, consumer electronics store, and transactions over $100 may represent the filters used to generate the segment. The system may also determine that the average fraud rate for Issuer A's peers within this same segment is 2.5%. Based on these facts, the system may determine whether the fraud processing overhead and losses associated with continuing to approve those transactions, which might be potentially fraudulent, outweigh the revenue generated from those transactions. This information can be used to determine whether a rule should be implemented to block or require further authentication for those transactions in the future. In some embodiments, a rule may be generated that blocks, or requires further authentication for, any transaction that would fall within that segment. In the illustrated example, if the system determines that domestic, e-commerce transactions conducted at consumer electronics stores for amounts over $100 cost Issuer A $25,300 per year (e.g., in paying for potentially fraudulent transactions and/or paying for the costs associated with processing fraud claims) and only generate $21,400 in revenue, then a rule may be generated for Issuer A that blocks or requires further authentication for all domestic, e-commerce transactions conducted at consumer electronics stores for amounts over $100.

Figure 7:
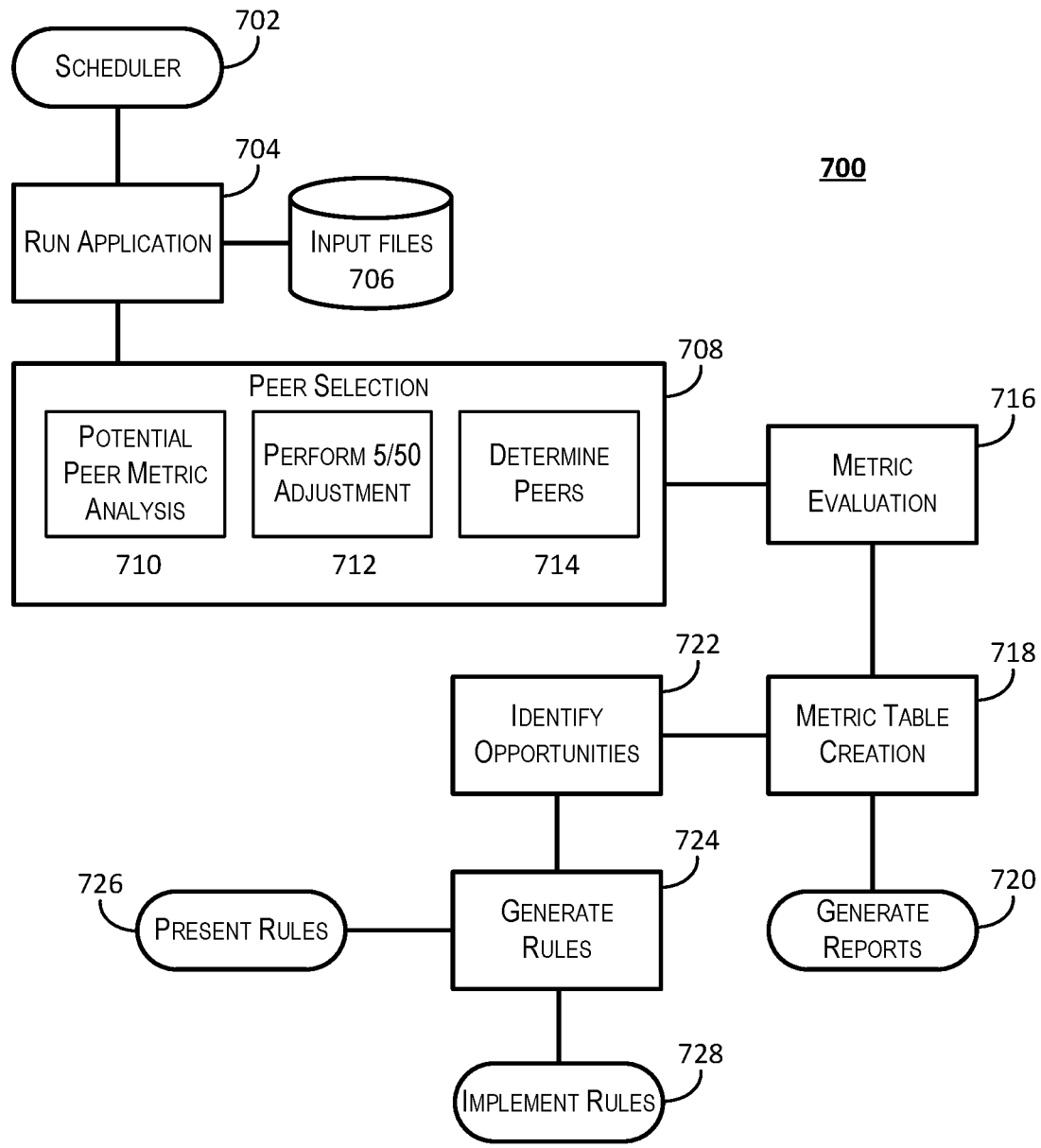
FIG. 7 depicts an illustrative flow chart showing a process for segmenting data and utilizing the processed data in accordance with embodiments of the disclosure.

FIG. 7 depicts an illustrative flow chart showing a process for segmenting data and utilizing the processed data in accordance with embodiments of the disclosure. Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the one or more processing network servers 202 depicted in FIG. 2. The code may be stored on a computer-readable storage medium, for example, in the form of a computer program including a plurality of instructions executable by one or more processors. The computer-readable storage medium may be non-transitory.

In accordance with at least some embodiments, process 700 may be initiated at 702 by a scheduler. In some embodiments, the process may be initiated on a periodic basis (e.g., monthly, daily, hourly, etc.). In some embodiments, process 700 may be executed separately for each target entity in a set of target entities. In some embodiments, process 700 may be initiated upon receiving a request from a user (e.g., an administrator). In some embodiments initiation of process 700 may involve the execution of a script or application at 704. In accordance with embodiments of the disclosure, a script or application may comprise any suitable set of computer-executable instructions.

In some embodiments, the system may maintain a number of input files 706 associated with various target entities. In some embodiments, input files 706 may comprise rules associated with a target entity and/or filters to be applied to transaction data for a target entity. For example, each entity may provide its own indication of segments that it is interested in by providing a list of filters to be applied. In some embodiments, input files may include a number of default filters to be applied to transaction data. In accordance with embodiments of the disclosure, execution of the application at 704 may cause the system to segment a set of aggregated transaction data in accordance with the information provided in the input files 706.

In some embodiments, peers may be dynamically selected for each segment. The process 700 may, upon segmenting the aggregated transaction data as described above, execute a peer selection subprocess for each of the data segments at 708. Subprocess 708 may begin at 710, when one or more peer entities are identified for a data segment with respect to a target entity. In some embodiments, the subprocess 708 may calculate values for one or more metrics associated with the target entity for a particular segment. The subprocess may then identify entities that have metric values are within a predetermined range of metric values of the target entity, and may include those identified entities as potential peers.

Once a set of potential peers has been identified, the set of peers may be subjected to a 5/50 process (or similar filtration process) to eliminate some of potential peers in the identified set of peers that may not be appropriate to make a comparison with. In a 5/50 process, the system ensures that the set of peers includes at least five peers and that none of the peers in the set of peers account for 50% or more of the transactions in the segment. By eliminating peers that account for 50% or more of the transactions in a segment, the system can limit peers to those that conduct a similar number of transactions to the target entity. Additionally, requiring that at least a target minimum number of peers (e.g., 5 in the 5/50 process) are selected ensures a minimum sufficient sample size. It should be noted that although the process is noted as a 5/50 process, the minimum number of peers in the peer set may be set to something other than 5. Additionally, a different transaction threshold may be set for which peers should be eliminated from the peer set. In some embodiments, the set of peers may be adjusted based on execution of the 5/50 process. For example, upon determining that a minimum number of peers has not been met by the current set of peers, the system may identify the next closest entity to the target entity to be added to the set of peers. This may be repeated until the set of peers includes the minimum number of peers. In some embodiments, any peer in the set of peers associated with at least the number of transactions in the transaction threshold may be removed from the set of peers. If this results in the set of peers including less than the minimum number of peers, then additional peers may be added. Once the 5/50 process has been performed with respect to the set of peers, the set of peers may be finalized at 714.

Metrics may be evaluated with respect to the target entity and the peers in the set of peers at 716. In some embodiments, an average value may be determined for the peers. For example, if the system is assessing fraud rates for a particular segment, then an average fraud rate may be determined for the peers in the set of peers. In some embodiments, a distribution of values may be determined for the peers in the set of peers. For example, the system may calculate high, medium, and low values for the set of peers.

After calculating each of the metrics associated with the target entity and the set of peers, the metrics may be recorded in a metric table associated with the target entity at 718. In some embodiments, access to the metric table may be provided to the target entity or an agent of the target entity. For example, the metric table may be provided to a reporting tool. In some embodiments, reports may be generated automatically from the metric table. For example, reports may be generated on a periodic basis and provided to the target entity.

In some embodiments, the system may be configured to identify opportunities associated with the target entity within the generated metric table at 722. In some cases, this may comprise identifying one or more segments for which a variance between metric values for the target entity and values for peer entities is above a threshold variance level. Additionally, opportunities may only be assessed where the variance is detrimental (e.g., having a negative impact on the target entity). For example, if a fraud rate for the target entity within a certain segment is significantly lower than a fraud rate for the set of peers within that same segment, then the system may not take any action with respect to that variance. In some embodiments, the system may determine whether to generate a rule for an identified opportunity based on a cost/benefit analysis performed with respect to the opportunity identified.

In some embodiments, the system may identify a lowest level in which opportunities exist by identifying the micro-segment with the highest level of specificity. For example, consider a scenario in which an opportunity exists in a segment associated with filters A, B, and C. In this scenario, the system may also determine that an opportunity exists with respect to a micro-segment associated with filters A, B, C, and D. In this example, a rule may be generated with respect to the micro-segment associated with filters A, B, C, and D and not the segment associated with filters A, B, and C. In this scenario, it may be assumed that by fixing the micro-segment, the segment will also be fixed.

In some embodiments, the system may be configured to generate rules based on the opportunities identified at 724. In some embodiments, rules may comprise a set of instructions configured to correct or increase a metric. For example, rules may comprise fraud detection rules configured to prevent fraudulent transactions upon which an authorization entity may approve or decline transactions. In some embodiments, rules may be generated based on the filters associated with the segment for which the opportunity has been identified. For example, upon identifying an opportunity associated with the micro-segment having the highest degree of specificity, a rule may be generated that blocks transactions that would typically fall into that micro-segment. For example, a rule may be generated with respect to a micro-segment associated with filters A, B, C, and D that results in any future transactions affected by each of the filters A, B, C, and D being blocked.

In some embodiments, generated rules may be presented at 726. For example, the generated rules may be presented to a system administrator or an administrator for the target entity. In some embodiments, the rules may be implemented automatically (e.g., without further human interaction) at 728. For example, the rules may be added to a rules file (e.g., the input files 706) maintained with respect to the target entity, such that future transactions received in relation to the target entity may be subjected to the generated rule.

Figure 8:
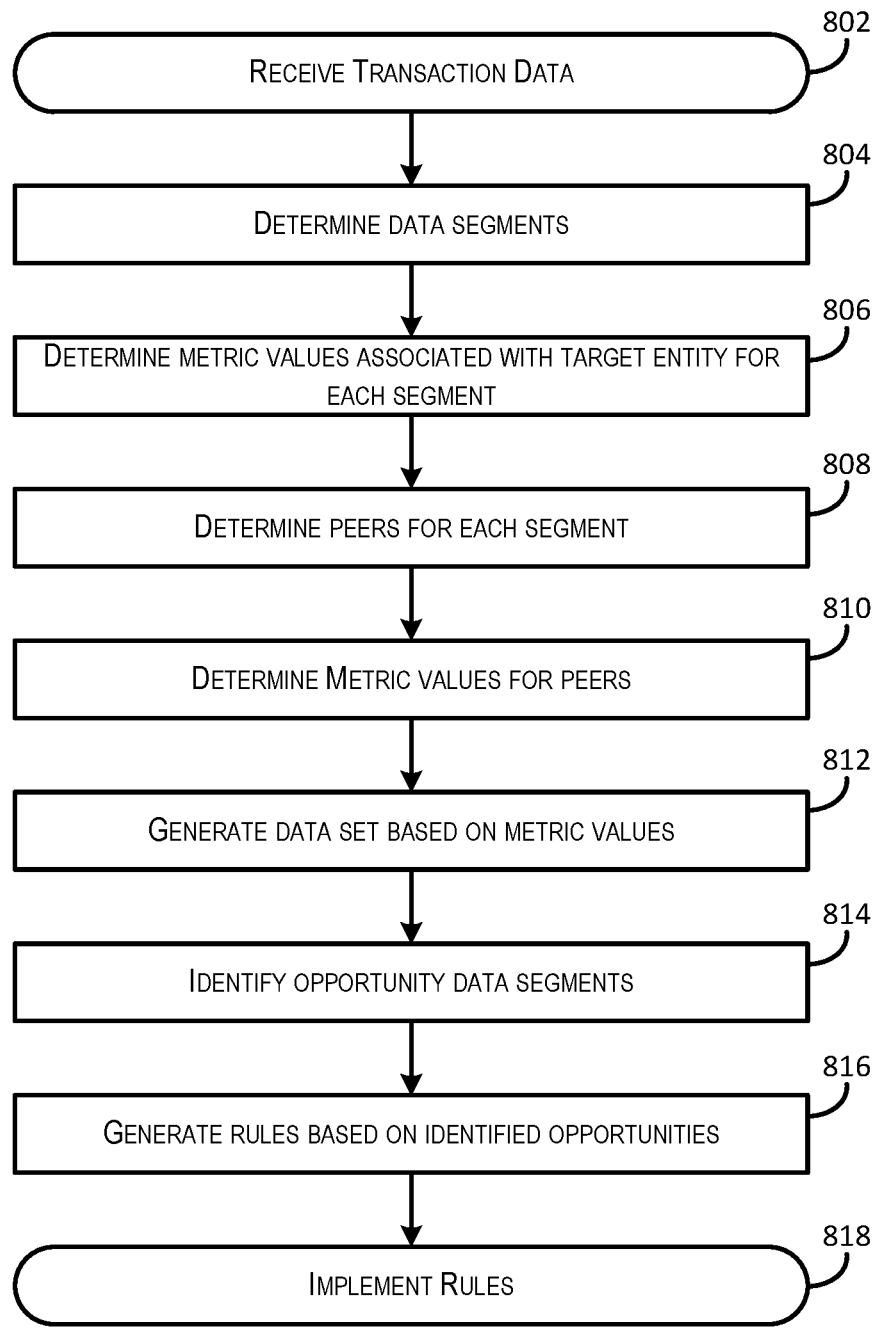
FIG. 8 depicts an illustrative flow diagram showing a process for automatically generating and implementing rules in accordance with at least some embodiments of the disclosure.

FIG. 8 depicts an illustrative flow diagram showing a process for automatically generating and implementing rules in accordance with at least some embodiments of the disclosure. In accordance with at least some embodiments, process 800 may be implemented on processing network server 202 as depicted in FIG. 2.

In some embodiments, process 800 may begin at 802, when a processing network server receives data for a plurality of transactions associated with a plurality of entities. In some embodiments the entities may comprise resource providers (e.g., merchants), transport computers (e.g., acquirers), authorization entities (e.g., issuers), or any other suitable entities. The transaction information received may pertain to transactions conducted by one or more of the entities. In some embodiments, the transaction data may be aggregated into a single data set.

At 804, the process 800 may determine, based on characteristics associated with the data, a plurality of data segments into which the data may be segregated. For example, the data may be filtered based on certain characteristics. In some embodiments, the data may be subjected to a number of filters in order to generate multiple segments. In some embodiments, a segment may comprise a micro-segment.

At 806, the process 800 may determine a value for a target entity with respect to the data segment. In some embodiments, the value may be calculated based on transaction types. For example, to determine a fraud rate for a particular entity, the processing network server may identify a number of transactions that have been flagged as being fraudulent and divide that number by the total number of transactions. In this example, the system may use transactions that are over a threshold age (e.g., more than 90 days old) in order to ensure that all fraudulent transactions have been flagged.

At 808, the process 800 may determine a set of peers for the data segment based on the value for the target entity and values for potential peers. In some embodiments, a set of peers may be determined based on different metrics than those being evaluated. For example, the system may be configured to evaluate fraud rates for a target entity, but the peers set may be determined based on transaction volume.

At 810, the process 800 may determine a metric value for each peer in the set of peers with respect to the data segment. In some embodiments, an average value may be determined for the peers. For example, if the system is assessing fraud rates for a particular segment, then an average fraud rate may be determined for the peers in the set of peers. In some embodiments, a distribution of values may be determined for the peers in the set of peers. For example, the system may calculate high, medium, and low values for the set of peers.

At 812, the process 800 may generate a data set (e.g., a metric table) to include at least the values for the target entity with respect to each data segment in the plurality of data segments and the values for the set of peers with respect to each data segment in the plurality of data segments. In some embodiments, the system may assess a number of target entities. In these embodiments, separate data sets may be generated for each of the multiple target entities.

At 814, the process 800 may identify opportunity segments from the generated data set. In some embodiments, opportunity segments may comprise data segments in which one or more metric values varies significantly from metric values for the set of peers (in a detrimental manner). In some embodiments, opportunity segments may be identified when the metric values for a target entity vary from the metric values for the peer entities by an amount of variance that exceeds a variance threshold.

At 816, the process 800 may generate rules based on the identified opportunity segments. In some embodiments, rules may be generated based on the filters used to generate a particular segment. For example, a rule may be generated that prevents authorization of, or restricts authorization of, transactions that would be included in the segment based on the filters. In some embodiments, the rules may be generated only for the most specific segment (e.g., the segment having the highest number of filters applied) in a set of opportunity segments.

At 818, the process 800 may implement the generated rules. In some embodiments, implementation of the generated rules may comprise the addition of the rule to a rule file used by the target entity to approve or decline transactions. In some embodiments, the rule may be written to a rule database currently in use. In some embodiments, the rule may be provided to an administrator or other user for manual implementation.

Embodiments of the disclosure provide several technical advantages over current systems. By dynamically selecting a set of peers with respect to each different segment, the system controls for certain transaction risks and provides for a more accurate assessment of the target entity. For example, in systems which compare a target entity to a set of static peers, inaccuracies may be introduced in values for segments in which various peers in the static set of peers may be more or less active than the target entity, leading to inflated or deflated metrics. This problem is solved in the current disclosure by dynamically selecting a separate set of peers for each segment.

In addition to enabling a more accurate assessment of a target entity, the system also enables automatic implementation of rules to correct variances in future transactions. This allows an issuer to take advantage of its performance with respect to various other organizations to improve its overall metrics by generating rules for specific segments. For example, if the rules are fraud detection rules, the system allows an issuer or other entity to more accurately assess whether a transaction should be approved or declined based on metrics associated with a segment to which the transaction belongs. Additionally, in embodiments that provide for automatic implementation of rules, an entity using the disclosed system is able to adapt to new trends more quickly than if using a current system.

Compared to conventional systems, embodiments of the invention can also automatically optimize metrics such as fraud rates and parameters such as so that they can produce optimal results. For example, by effectively utilizing peer data from its peers, a target entity may optimize its fraud process by not denying too many transactions that are legitimate and authorizing too many transactions that might be fraudulent. In embodiments of the invention, group dynamics (i.e., leveraging the performance of and knowledge of multiple entities that might be peers) can be used to identify optimal performance whereas this was not possible in conventional systems.

A computer system may be used to implement any of the entities or components described above. The subsystems used to implement the disclosure may be interconnected via a system bus. Additional subsystems such as a printer, a keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of generating a data set comprising:
   receiving, by a server computer, data for a plurality of transactions associated with a plurality of entities;
   generating, by applying a set of filters to the data, a plurality of data segments, each data segment of the plurality of data segments being generated by applying a different filter of the set of filters to the data;
   identifying a target entity from the plurality of entities;
   determining, based on characteristics associated with the data, a plurality of sets of peers corresponding to the plurality of data segments
   by, for each data segment in the plurality of data segments:
      determining a value for the target entity with respect to the data segment;
      determining a set of peers corresponding to the data segment of the plurality of data segments based on the value for the target entity, the set of peers dynamically determined for the data segment based on each of the peers having a corresponding value within a predetermined range of the value for the target entity, and based on each of the peers accounting for less than a predetermined transaction volume threshold; and
      determining a value for the set of peers with respect to the data segment;
   generating a data set to include at least the values for the target entity with respect to each data segment in the plurality of data segments and the values for each corresponding set of peers in the set of peers with respect to each data segment in the plurality of data segments;
   identifying at least one data segment of the plurality of data segments for which a variance between the value for the target entity and the value for the set of peers is above a threshold variance level;
   determining that the variance is detrimental;
   generating a rule to limit future transactions that would affect the at least one data segment; and
   instantiating the generated rule with respect to the target entity by:
      receiving an indication of a transaction associated with the at least one data segment; and
      generating an authorization response message declining the transaction.

2. The method of claim 1, wherein the rule is generated with respect to a fraud detection system.

3. The method of claim 1, wherein the set of peers comprises a set of entities of a same type as the target entity.

4. The method of claim 1, wherein the set of peers is determined based on a transaction volume with respect to the data segment.

5. The method of claim 1, wherein the set of peers is determined based on the transaction volume for each of the peers being within a range of the transaction volume for the target entity.

6. The method of claim 1, wherein the predetermined range is determined based on the data segment.

7. The method of claim 1, wherein the plurality of data segments are determined based on one or more filters associated with the characteristics.

8. The method of claim 1, wherein the rule to limit future transactions that would affect the at least one data segment comprises a rule to block or require further authentication for all future transactions that meet conditions set forth in the set of filters associated with the at least one data segment.

9. The method of claim 1, further comprising:
   generating, by applying a second set of filters to the at least one data segment of the plurality of data segments, a plurality of data micro segments, each data micro segment of the plurality of data micro segments being generated by applying a different filter of the second set of filters to the data;
   determining, based on characteristics associated with the data, a second plurality of sets of peers corresponding to the plurality of data micro segments; and
   identifying at least one data micro segment of the plurality of data micro segments for which a variance between the value for the target entity and a value for a set of peers associated with the at least one data micro segment is above the threshold variance level, wherein the rule to limit future transactions that would affect the at least one data segment comprises a rule to block transactions associated with the at least one data micro segment.

10. The method of claim 1, wherein the indication of the transaction associated with the at least one data segment is received from an access device and further comprising transmitting the generated authorization response message to the access device.

11. A server apparatus comprising:
    one or more processors; and
    a memory including instructions that, when executed by the one or more processors, cause the server apparatus to:
       receive, by the server apparatus, data for a plurality of transactions associated with a plurality of entities;
       generate, by applying a set of filters to the data, a plurality of data segments, each data segment of the plurality of data segments being generated by applying a different filter of the set of filters to the data;
       identify a target entity from the plurality of entities;
       determine, based on characteristics associated with the data, a plurality of sets of peers corresponding to the plurality of data segments,
       by, for each data segment in the plurality of data segments:
          determine a value for the target entity with respect to the data segment;
          determine a set of peers corresponding to the data segment of the plurality of data segments based on the value for the target entity, the set of peers dynamically determined for the data segment based on each of the peers having a corresponding value within a predetermined range of the value for the target entity, and based on each of the peers accounting for less than a predetermined transaction volume threshold; and determine a value for the set of peers with respect to the data segment;

generate the data set to include at least the values for the target entity with respect to each data segment in the plurality of data segments and the values for each corresponding set of peers in the set of peers with respect to each data segment in the plurality of data segments;

identify, within the generated data set, a number of opportunity data segments based on a variance between the value for target entity and the value for the set of peers being greater than a threshold variance level for each respective opportunity data segment;

generate one or more rules based on the identified number of opportunity data segments; and instantiate the one or more rules with respect to the target entity by:

receiving an indication of a transaction associated with the opportunity data segments; and automatically rejecting the transaction.

12. The server apparatus of claim 11, wherein the one or more rules are provided to an administrator.

13. The server apparatus of claim 11, wherein the one or more rules are written to a rules database table.

14. The server apparatus of claim 11, wherein the value for the set of peers comprises at least an average value for the set of peers.

15. The server apparatus of claim 11, wherein the value for the set of peers includes a high value, a medium value, and a low value.

* * * * *